Figure 1:
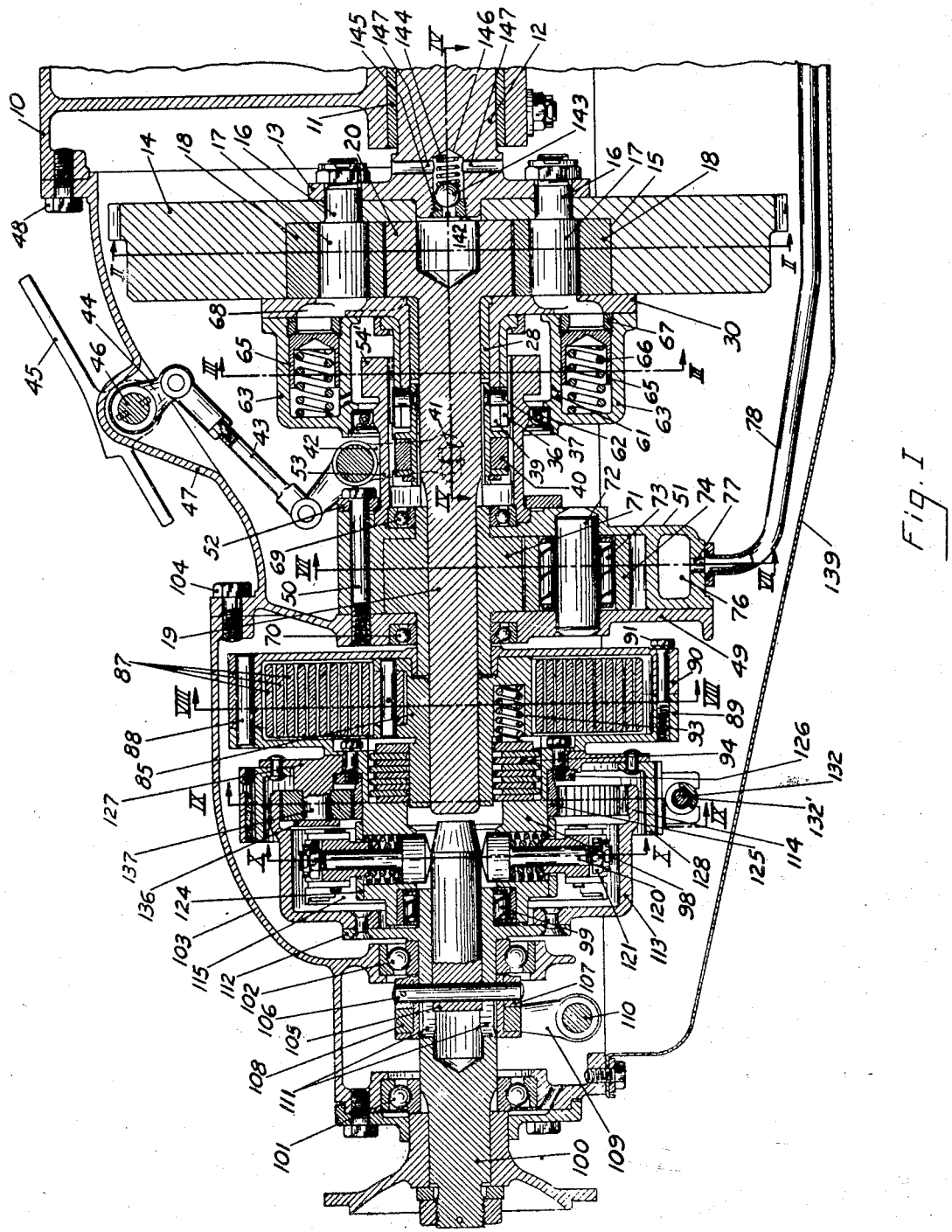

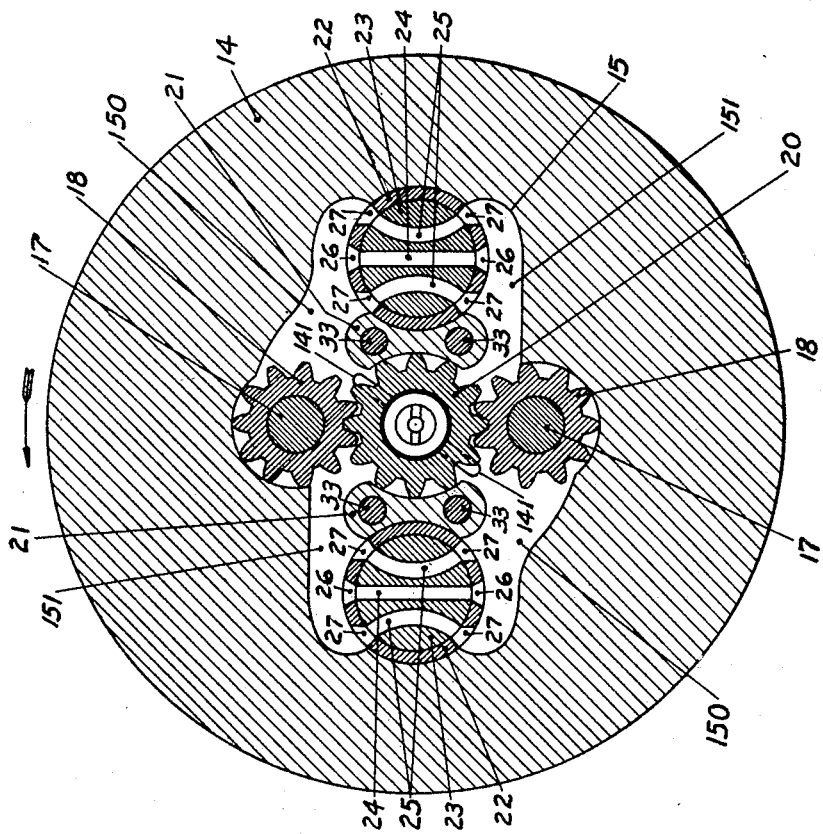
Fig. I
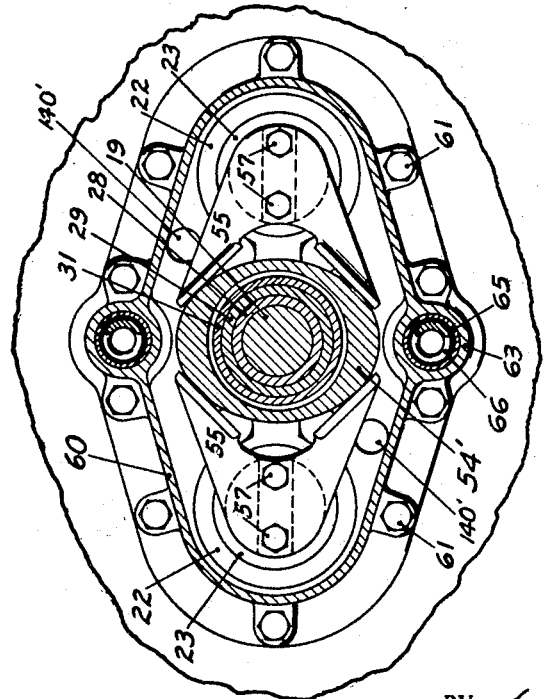
Fig. II
INVENTOR.
Alva B. Gilbert
BY Kivis Hudson+Kent
ATTORNEYS.

July 14, 1931.  A. B. GILBERT  1,814,442
VEHICLE TRANSMISSION
Filed Feb. 21, 1929   4 Sheets-Sheet 3
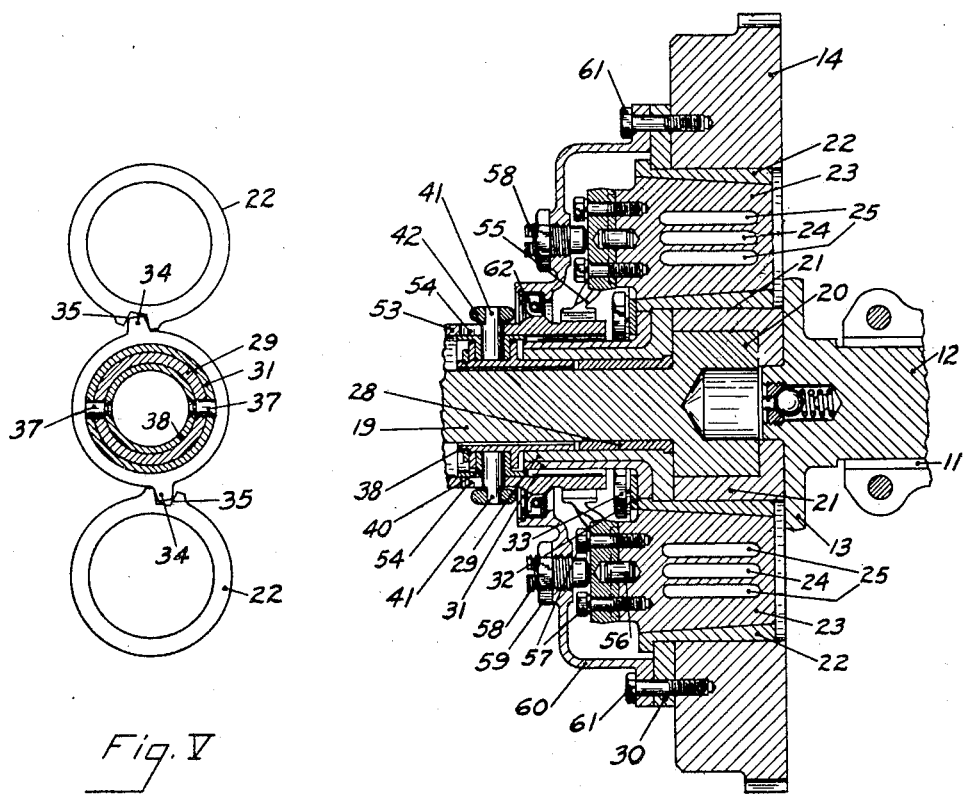
Fig. IV
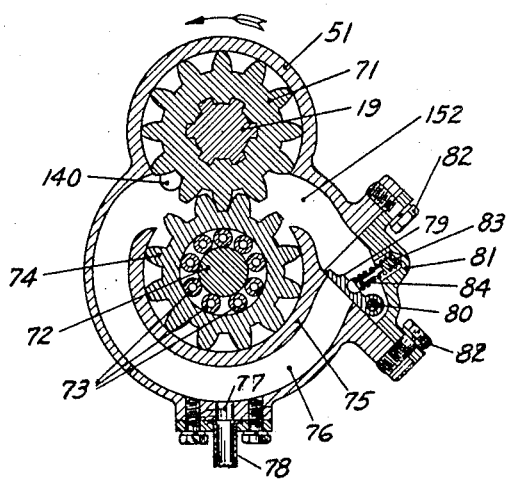
Fig. V
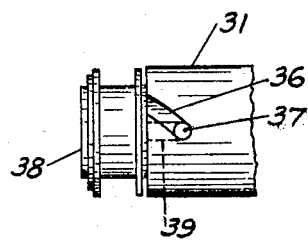
Fig. VI
Fig. VII
INVENTOR.
Alva B. Gilbert
BY
Kwin Hudson & Kent
ATTORNEYS.

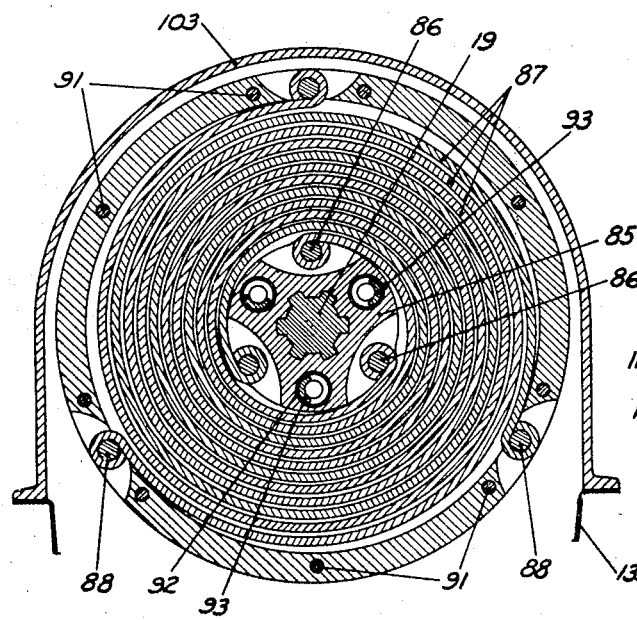
Fig. VIII
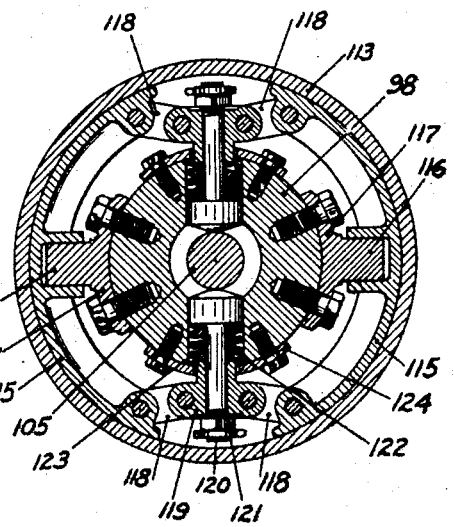
Fig. X
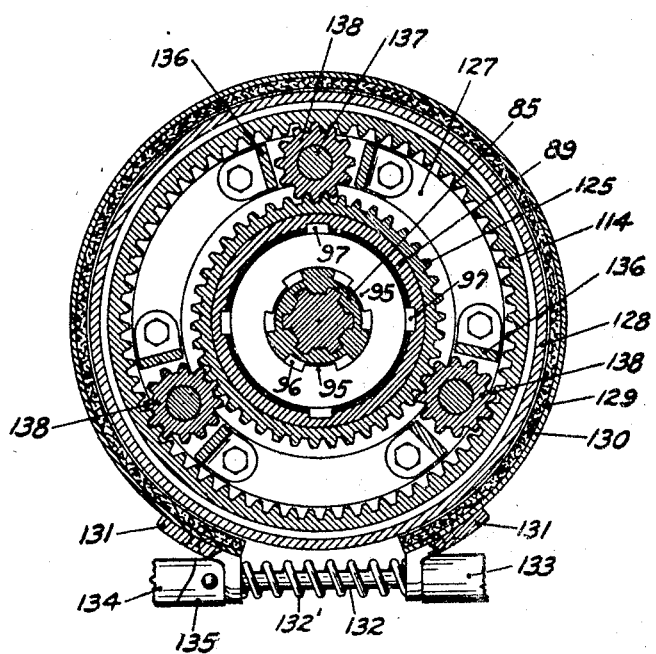
Fig. IX
INVENTOR.
Alva B. Gilbert
BY
ATTORNEYS.

Patented July 14, 1931

1,814,442

UNITED STATES PATENT OFFICE

ALVA B. GILBERT, OF ELYRIA, OHIO

VEHICLE TRANSMISSION

Application filed February 21, 1929. Serial No. 341,714.

This invention relates to improvements in vehicle transmissions, although in their broader aspects some of the features of the invention are applicable to change speed transmissions generally. The invention has to do particularly with means for enabling the operator to utilize at will any one of an infinite number of speed ratios.

One of the objects of the invention is the provision of a transmission which will enable the operator to employ at any instant the best possible speed ratio for the condition confronting him at that particular instant, instead of being limited, as in the conventional transmission, to three different speeds.

Another object of the invention is to facilitate and quicken speed changes in an automobile and to reduce the noise incident to making such changes.

Another object is to effect speed changes without interrupting the application of driving force to the driven shaft, thus increasing the efficiency of the transmission and causing it to function smoothly during speed changes.

Another object is the elimination of the usual friction clutch, the use of which is essential where the driven shaft must be disconnected from the driving shaft while a speed change is being effected.

Another object is the provision of a transmission which shall be adapted to give a flexible power application for driving a vehicle in which a relatively inflexible motor is employed, as for instance, a Diesel engine.

Still another object is the provision of a hydraulic clutch of special design capable of being set and released at rapidly recurring intervals without undue wear.

Other objects and features of novelty will appear as I proceed with the description of that embodiment of the invention which, for the purposes of the present application, I have illustrated in the accompanying drawings, in which:

Fig. I is a longitudinal vertical section through a vehicle transmission embodying the invention;

Figs. II and III are transverse sectional views taken on the lines II—II and III—III of Fig. I;

Fig. IV is a horizontal sectional view taken substantially on the line IV—IV of Fig. I;

Fig. V is a detail view, partly in section, illustrating the method I employ for imparting movements of adjustment to the hydraulic clutch valves;

Fig. VI is a detail view of another portion of the valve control mechanism; and

Figs. VII, VIII, IX and X are transverse sectional views taken substantially on the lines VII—VII, VIII—VIII, IX—IX, and X—X of Fig. I.

If a power driven rotating element possessing considerable inertia, as for instance, a fly-wheel, is suddenly relieved of its load, it accelerates rapidly. If the load then be returned, there is a gain in torque represented by the additional speed attained by the said rotating element. The transmission disclosed herein is an application of this principle, involving the clutching and declutching of the driving and driven shafts in rapid succession so as to impart to the driven shaft a series of driving impulses. In the embodiment disclosed, this clutching and declutching occurs twice during each revolution of the driving shaft. For a given setting of the mechanism, the engine shaft turning at a given speed produces a series of impulses in the driven shaft which cause that shaft to turn with a lower speed but with greater torque than it would have were it locked to the driving shaft. I also provide means for varying manually the relative lengths of the periods of clutching and declutching with this result that the greater the length of the clutching periods, the greater the speed of the driven shaft and the less the torque, while the shorter the length of the clutching periods, the slower becomes the speed of the driven shaft and the greater its torque. Carrying this control to its limits, I am enabled to stop the driven shaft by reducing the clutching periods to zero, and on the other hand I am able to secure a direct drive from one shaft to the other by reducing the declutching periods to zero. Having given this brief statement of the principle of the invention, I will now proceed with the description of the embodiment illustrated herein.

Referring to Fig. I, 10 is a fragment of the crank case of an internal combustion engine, the rear main bearing of which is shown at 11. The crank shaft 12 at its rear end has a flange 13 upon which is mounted the engine fly-wheel 14. The latter has a cavity 15 in its rear side. The fly-wheel 14 is secured to the flange 13 by means of a pair of bolts 16 having enlarged cylindrical heads 17 which serve as spindles for pinions 18. Arranged in alignment with the engine shaft 12 is a driven shaft 19, upon the forward end of which is mounted a pinion 20 that extends between and meshes with both of the pinions 18.

The three pinions 18, 18, 20, together constitute a double gear pump. The operation of the fly-wheel in the direction of the arrow, Fig. II, tends to cause the pinions 18 to roll upon the pinion 20 in the same direction and to produce a flow of oil or whatever liquid may be carried in the cavity 15.

On either side of the pinion 20, there are partition blocks 21 formed preferably as integral parts of the fly-wheel, these blocks having concave faces cooperating with the ends of the teeth on pinion 20. The opposite faces of the blocks 21 are also concave and are engaged by valve sleeves 22 which have a limited rotary movement, as will be presently explained.

The inner surfaces of the sleeves 22 are tapered, as illustrated in Fig. IV, for the reception of correspondingly tapered oscillating plugs 23. Each plug is provided with a straight transverse slot or passage 24 and two curved slot-shaped passages 25, these passages being adapted to connect pairs of ports 26 and 27, respectively, in the sleeves 22.

The forward end of shaft 19 is rotatable in bushing 28 which fit into a bushing retainer 29 formed integral with a plate 30 that engages and is secured to the rear face of the fly-wheel. Rotatably mounted on the outer side of the retainer 29, there is a sleeve 31, which has a short radial flange at its forward end. A ring 32 overlaps the flange on the forward end of the sleeve 31, and is held in that position by screws 33 which are set into the partition blocks 21 and extend through holes in plate 30. The sleeve 31 is thus held against longitudinal movement.

The flange at the forward end of the sleeve 31 is provided at diametrically opposite points with teeth 34, each of which engages a socket 35 formed in the rear end of one of the valve sleeves 22 (see Fig. V). Obviously, the rotation of sleeve 31 relative to the fly-wheel turns the sleeves 22 upon their axes, thereby varying the positions of the ports 26 and 27. This relative rotation of the sleeve 21 is accomplished by means of a pair of spiral slots 36 in which run pins 37 that are mounted in sleeve 38. The pins 37 extend also through longitudinal slots 39 in the bushing retainer 29. Hence the sleeve 38 turns with the retainer 29 and, therefore, with the fly-wheel. The sleeve 38 is provided with a peripheral groove in which runs a collar 40 provided with outwardly extending pins 41, the outer ends of which are engaged by the bifurcated extremities of a rock lever 42. Hence the sleeve 38 with its pins 37 may be caused to move backward and forward, and the engagement of the pins 37 in the spiral slots 36 transmits a turning movement to the sleeve 31 and through the teeth 34 and sockets 35 to the valve sleeves 22. The lever 42 may be connected by means of a link 43, adjustable as to length, with a foot lever 44 that is adapted to be swung through a limited angle by a foot pedal 45.

The fulcrum pin 46, to which the lever is attached, is mounted in suitable bearings in a casing section 47, the latter being preferably attached directly to the crank case 10 by screws 48 or the like. At its rear end, this casing section carries a vertical plate 49 to which is attached by a series of screws 50 a gear housing 51. The screws 50 also extend through a ring 52 which engages a shoulder on a cylindrical element 53, supporting the latter concentrically with respect to the shaft 19. The element 53 is provided with slots 54 through which the pins 41 extend.

At its forward extremity, the element 53 carries a cam 54' which, in the present instance, has two high spots. The cam is engaged by two followers 55, identical in form, each of which has two engaging surfaces arranged 90° apart. The movements of the cam follower are very rapid, and hence the two follower surfaces are employed rather than a single surface held against the cam by spring pressure. The followers 55 are rigidly secured to the rear ends of the corresponding oscillating plugs 23, being centered by means of dowel pins 56 and fastened in place by screws 57. The cam 54' is stationary, and the rotation of the fly-wheel causes the followers 55 to be rocked by the cam, and thus transmit oscillating motion to the plugs 23. The plugs 23 may be held to their tapered seats in the sleeves 22 by round ended screws 58 and lock nuts 59, these screws being threaded into a housing 60 which is secured to the rear face of the fly-wheel by screws 61. An oil-tight packing 62 seals the joint between the rotating housing 60 and the stationary cylindrical element 53.

The housing 60 at oppositely located mid portions is provided with integral cylinders 63 connected with the interior of the housing by oil holes 64. In each of these cylinders, there is a piston 65 which is pressed forwardly by a coil spring 66 against a stop 67. The space in the housing 60 at the forward side of the piston 65 is connected with the pocket 15 of the fly-wheel by a passage 68 of copious size in the plate 30. The spring pressed pistons 65, therefore, serve as safety pressure relief means, making the clutch somewhat yielding.

Within the housing 51 there is mounted, preferably upon ball bearings 69 and 70, the elongated hub portion of a pinion 71. This pinion is fixed to the shaft 19, and hence the ball bearings 69 and 70 constitute bearings for the shaft as well as for the pinion. 72 is a fixed shaft mounted in the plate 49 and housing 51. Bearing rollers 73 surround the shaft 72 and rotatably support a pinion 74 which meshes with the pinion 71.

The pinion 71 makes a substantially oil tight contact with the upper portion of the housing 51, as shown in Fig. VII, while the pinion 74 contacts through the greater portion of its periphery with an internal wall 75 in the housing. Between the wall 75 and the lower part of the housing there is an oil passage 76. An oil inlet port 77 connects this passage with a copper tube oil line 78 leading from the delivery end of a pressure pump, (not shown). A flap valve 79 is arranged to seat upon the metal around one end of the passage 76, being hinged at 80 in a bracket 81 secured to the casing 51 by screws 82. A coil spring 83 working against the spherical head of a pin 84, presses the valve 79 toward its seat.

Secured upon the rear end of shaft 19 is a hub 85 which is recessed at intervals throughout its periphery for the reception of anchoring pins 86, by means of which one or more helical springs 87 are secured to the shaft. In the embodiment illustrated, I employ three such springs. Their outer extremities are anchored upon pins 88 which are carried by the two parts 89 and 90 of a spring housing, these parts being held together by screws 91 or other suitable means.

Intermediate the pins 86, the hub 85 is provided with sockets 92 in which are seated coil springs 93 that press against the forward element of a multiple plate clutch 94. The driving elements of this clutch are provided with projections 95 that work in wide spline grooves 96 formed in the hub 85, whereby some little relative movement is possible between the driving plates and the shaft 19. The driven plates of this clutch are provided with projections 97 which fit corresponding grooves in an extension of the housing member 89. The plate element which is furthest away from the coil springs 93 abuts against a collar 98 that is a further extension of the housing 89, and is rotatably supported at its rear end upon a roller bearing 99.

In alignment with the driven shaft 19, and to the rear thereof, is a further shaft 100, hereinafter referred to as the propeller shaft, although as shown herein the shaft 100 in reality constitutes only the forward portion of the propeller shaft, the rear portion of which would normally be attached to the shaft 100 by a universal joint. The shaft 100 is mounted in a pair of ball bearings 101 and 102 which are carried by bearing supports formed integral with a casing section 103 that is attached to the section 47 by screws 104 or the like. In an axial bore in the front end of shaft 100 I mount to slide a cylindrical slide bar 105 having a tapered front end. Near its rear end, the bar 105 carries a transverse pin 106 which is mounted in a ring 107 forming one side of a groove for a collar 108 that is connected in the usual manner with a bifurcated lever 109 secured to a rock shaft 110 which may be manually oscillated by any desired means. Slots 111 in the shaft 100 permit the pin 106 to move back and forth.

Between the bearings 99 and 102, the shaft 100 has a flange 112 to which a drum 113 is riveted. On a forward extension of the drum 113, I provide an internal gear 114. Within the drum 113 there is a pair of shoes 115 adapted to bear frictionally upon the drum. The shoes 115 are connected by means of tongue and groove joints 116 with brackets 117 secured to the collar 98. The ends of each pair of shoes 115 are connected by toggle links 118 to a fitting 119 which surrounds a pin 120 having a large head with a curved end face bearing upon the slide bar 105. The pin 120 may be adjusted in the fitting 119 by means of a nut 121 threaded upon the pin and adapted to pull against a coil spring 122, which bears at its respective ends against the head of the pin and against the end of fitting 119. A second coil spring 123, surrounding the spring 122, bears at one end against the head of pin 120 and at the other end against an abutment plate 124 screwed to the collar 98. When the parts are in the position illustrated in Figs. I and X, the heads of pins 120 are in engagement with the cylindrical surface of slide bar 105. At such times, the pins 120 are forced outwardly against the pressure of coil springs 123, and the toggle links 118 are operated to force shoes 115 into contact with the drum 113. The hub 98 and the drum 113 are thereby locked together. Hence there is provided a direct drive connection between the outer ends of springs 87 and the drum 113 which, in turn, is attached to the shaft 100.

125 is a ring gear seated upon the collar 98 and having a flange 126 by means of which it is attached to the extension of the casing section 89, that is the integral portion between that section and the collar 98. Mounted on this same extension, so as to be capable of rotation relative thereto, is a ring 127 which carries a drum 128 that surrounds but does not touch the gear 114. This drum may be held against rotation by a band 129 lined with friction material 130. The band 129 carries end pieces 131 having bifurcations through which extends a shaft or rod 132. The latter is provided outside the end pieces 131 with stop collars 133 and 134. The collar 134 has a cam face cooperating with a rotatable cam 135, whereby the band may be contracted to grip the drum 128. A coil spring 132' surrounding the rod 132 tends to return the parts to the position illustrated in Fig. IX. The ring 127 has bolted or riveted thereto at intervals U brackets 136 which extend over the ends of spindles 137 formed upon the rings 127. These spindles carry pinions 138 which mesh with the ring gear 125 and with the internal ring gear 114. When the ring 127 is held still by the band 129, 130, rotation is transmitted from ring gear 125 through pinions 138 to internal gear 114 in a reverse direction and at a lower speed. Obviously, however, the direct drive clutch 113, 115 must first be released before the reverse drive can be employed. To this end, the rock shaft 110 and the cam 135 may be so connected as to be operable either by a single control means or by two separate control means, the single means being preferred.

An oil pan 139 may be supplied to extend underneath both of the casing sections 47 and 103 and even underneath the engine. The oil delivered through pipe 78 may come from the pressure pump employed to force oil to the various bearings of the engine, or from a separate pump as desired. An oil port 140 connects the space within the housing 51 with the space within the cylindrical element 53, from which it has free access to the space within the housing 60. From there it flows through suitable openings 140' in the plate 30 into the pockets 150 of the fly-wheel. Passages 141 connect the pockets 150 with a cavity 142 in the forward side of the fly-wheel at the center thereof. Oil may pass from this latter cavity through an adjustable pressure relief valve located in the rear end of the crank shaft 12. This relief valve comprises a ball 143 held to its seat by a spring 144, the tension of which is adjustable by means of a threaded hollow plug 145. The ball and spring 143, 144 are located in a socket 146 in the crank shaft, from which passages 147 extend radially to the periphery of the shaft.

*Operation.*—Assuming that the transmission is employed in an automobile, and that the engine thereof is in operation, and assuming that the valve sleeves 22 are in the neutral position, that is the position illustrated in Fig. II, the plugs 23 are then oscillating, being operated continuously from the crank shaft 12 through the fly-wheel 14 and the followers 55 running upon the fixed cam 54'. The oscillations of the plug 23 are through a limited angle however, which is insufficient to move the passages 24, 25 entirely out of register with the ports 26, 27 when the latter are in the position illustrated. The rotation of the fly-wheel in the direction indicated by the arrow in Fig. II rolls the pinions 18 around upon the then stationary pinion 20. The resulting rotation of the pinions 18 upon their own axes carries oil from the pockets 150 into pockets 151, tending to fill the latter completely and to leave the pockets 150 more or less unfilled. This does not actually occur, however, as the oil is free to flow through the ports 26, 27 and passages 24, 25. Hence, the rotation of the pinions 18 results merely in a flow of oil in an endless path in the cavity 15, with no force of any moment exerted upon the pinion 20. While this is going on, oil is flowing from the oil pump, not shown, through the tube 78, port 77, passage 76, and port 140 into the spaces within the cylindrical element 53 and housing 60, through passages 140' in plate 30 into pockets 150, through passages 141 into cavity 142, and thence through the relief valve, pocket 146 and passages 147 back to the crank case. This circulation not only serves to keep the oil pressure in the mechanism up to a predetermined value controlled by the setting of the hollow plug 145, but also prevents the oil within the cavity 15 and within the housing 51 from getting too hot.

Now, in order to put the automobile in motion in a forward direction, the driver places his foot upon the pedal 45 and rocks it slowly in the anti-clockwise direction, as viewed in Fig. I. The pins 41 are thereby moved rearwardly, carrying along with them the sleeve 38 to which the pins 37 are attached. These latter pins, moved in the straight slots 39 of the bushing retainer 29, are thereby prevented from revolving independently of the fly-wheel. Their movement along the spiral slots 36 of the sleeve 31 rotates that sleeve. Its rotation is transmitted through teeth 34 and sockets 35 to the valve sleeves 22, thereby moving the ports 26, 27 to one side of the positions illustrated, with the result that for a very brief interval during each oscillation of the plugs 23, the passages 24, 25 are closed. During such intervals, the pockets 151 become completely filled, and as oil is non-compressible and no more can enter these pockets, the rotation of the pinions 18 is momentarily stopped. In other words, the pinions 18 are locked to the pinion 20. A rotational impulse is thereby delivered to the pinion 20 and to the shaft 19 of which it is a part.

If the pedal 45 be rested at this position, these power impulses will be delivered to the pinion 20 and shaft 19 at regularly recurring intervals, that is twice during each revolution of the crank shaft. The strength of each impulse will depend upon the length of time between impulses, as it is during such time that momentum is built up in the fly-wheel. In the case now assumed, the momentum of the fly-wheel for the given engine speed will be substantially at its maximum and the torque impulses delivered to the shaft 19 will be at their maximum. But inasmuch as these torque impulses are separated by relatively long periods, the speed of rotation of the shaft 19 will be at a minimum. A very heavy torque at extremely low speed may thus be utilized.

Now, assuming that the driver continues the tilting of the pedal 45 in the same direction gradually as the automobile gains momentum, the valve sleeves 22 will turn slowly, thereby gradually increasing the time in each revolution during which the passages 24, 25 are completely cut off, and thereby increasing the length of time during which the power impulses act, while decreasing the length of time between impulses. The torque delivered to the shaft 19 will thus gradually decrease and the speed of rotation of that shaft will gradually increase. Throughout this operation, driving force is being delivered to the shaft 19 during each revolution instead of being removed entirely for an interval, as it must be in the operation of the conventional change speed gearing. Furthermore, the torque delivered may be made to approximate the ideal value for each instant of operation. Consequently, the length of time required to accelerate an automobile from standing start to high speed is much reduced over that required by the conventional transmission.

When the pedal 45 has been rocked to the limit of its motion, the sleeves 22 will have been rotated sufficiently to cut off the passages 24, 25 during the entire oscillation of the plugs 23, with the result that the pinions 18 and 20 are locked together, and the drive is direct and entirely continuous, that is without any power impulses. The reduction of speed and the removal of the driving power from the shaft 19 is accomplished by the tilting of the pedal 45 in the reverse direction with the consequent manipulation of the valve sleeves 22 in the reverse direction, as will be readily understood. When the ports 26, 27 are in their fully open position, corresponding to neutral in the conventional transmission, no power impulses are transmitted to the shaft 19.

Now, since the power impulses delivered to the shaft 19 in the intermediate speed positions would tend to produce vibration and to be somewhat harmful to the driving mechanism, I interpose between the shaft 19 and the propeller shaft 100 a cushioning means to absorb portions of these impulses and redeliver them to the shaft 100, thereby smoothing out the driving force. This cushioning means may take various forms, but that illustrated in the drawings will answer the purpose satisfactorily. The power impulses are transmitted by the shaft 19 to the inner ends of the springs 87, winding up these springs to a greater or lesser extent. The power thus stored in the springs is then more gradually delivered to the shaft 100 through the housing 89 and collar 98, clutch 115, 113 and flange 112. At times when the load is removed from the shaft 100, as when the clutch 115, 113 is released preparatory to using reverse gear, or when the rear wheels of the automobile are bouncing over rough places in the road, the springs 87 might unwind too rapidly. To offset this condition, I have supplied the multiple plate clutch 94 which merely introduces friction to slow up the unwinding movement above referred to.

An overrunning clutch must also be applied to the shaft 19 in order to prevent the unwinding force of the springs 87 from being applied to that shaft instead of to the shaft 100. While it is appreciated that purely mechanical overrunning clutches might be utilized in this connection, I prefer to employ the hydraulic clutch illustrated in Fig. VII. It is believed to be quicker in operation than a purely mechanical clutch. The pinion 71 rotates in the direction indicated by the arrow in Fig. VII. Oil is thereby taken from the space 152 and carried up and around into the passage 76. The pinion 74, of course, moves in the opposite direction, carrying oil downwardly and around into the passage 76. When this occurs, the flap valve 79 opens and oil enters the space 152 from the passage 76. The unwinding of the springs 87 tends to produce rotation of the pinion 71 in the direction reverse to that indicated by the arrow in Fig. VII. Such rotation would put pressure upon the oil in space 152, seating the flap valve 79 and holding it seated. There being then no exit for oil pumped into the space 152, the pumping must cease, which means that the pinions 71 and 74 cannot rotate in the reverse direction.

In the ordinary forward traveling of the automobile, the clutch 113, 115 remains constantly set. It is released only at times when the driver desires to utilize his reverse gears. At such times, the pedal 45 will be set in neutral position. The clutch 113, 115 will then be released, and thereafter the cam 135 will be operated to cause the band 129, 130 to grip the drum 128. The driver will then gradually tilt the pedal 145 to apply to the reverse gearing as much speed as may be desired, the high limit, however, being less than that possible in the forward direction of travel, due to the gear reduction in the reverse gearing itself.

While I have illustrated and described herein a hydraulic means for clutching and declutching the shafts 12 and 19, the invention in its broader aspects contemplates the use, in this connection, of any means, including purely mechanical mechanisms, for accomplishing the results stated. I have shown two oscillating plugs 23, as the balance of the fly-wheel is better maintained in this manner, than it could be where only one such plug is employed, but it should be understood that the number of these plugs may be varied as desired. The number of oscillations imparted to each plug may also be varied so as to produce one or more impulses per engine revolution. When the main clutch is disengaged, the reactionary force of the propeller shaft torque is transmitted to the case by the over-running clutch. The latter is relieved of this force at the instants when the main clutch is in engagement. This intermittent application of force to, and removing it from, the casing causes vibrations.

I propose to take advantage of this fact for the purpose of causing the vibrations due to these impulses and the vibrations due to torque impulses in the engine to counteract each other more or less. In order to do this, it is necessary to impart the correct number of impulses to the driven shaft for each revolution of the engine, that is to say, two such impulses where a four cylinder, four cycle engine is used, three such impulses for a six cylinder, four cycle engine, four for an eight cylinder, four cycle engine, etc. The proper timing of the impulses with respect to the torque vibrations can best be determined by trial.

Numerous other changes not specifically mentioned may be made without departing from the spirit of the invention, and I desire it to be understood that such detailed disclosure as has been made herein is primarily for the purpose of fully illustrating the invention, and is not to be construed as a limitation upon the scope thereof.

Having thus described my invention, what I claim is:

1. In mechanism of the class described, a drive member, a driven member, a clutch adapted to hold said members against rotation at different speeds, and means independent of the relative speeds of rotation of said members for automatically setting and releasing said clutch periodically.

2. In mechanism of the class described, a power shaft, a driven shaft, a clutch adapted to hold said shafts against relative rotation, and means unaffected by the relative speeds of the shafts and actuated automatically from one of the said shafts only for setting said clutch during a portion only of each revolution of that shaft.

3. In mechanism of the class described, a power shaft having a fly-wheel, a driven shaft in alignment with said power shaft, a clutch carried partially by said fly-wheel and partially by said driven shaft, and means independent of the relative speeds of rotation of said shafts and actuated from one of said clutch carrying elements only for automatically setting and releasing said clutch periodically.

4. In mechanism of the class described, a power shaft, a driven shaft, a hydraulic clutch adapted to hold said shafts against relative rotation, and means actuated from one of said shafts only for setting and releasing said clutch periodically.

5. In mechanism of the class described, a power shaft, a fly-wheel associated therewith, a driven shaft in alignment with the axis of said fly-wheel, said fly-wheel having therein an endless passage, a barrier extending across said passage, said barrier comprising a fluid pump carried partially by said fly-wheel and partially by said driven shaft, the relative movement of said parts of said pump permitting rotation of the fly-wheel with respect to the driven shaft, and means timed to the rotation of said fly-wheel acting periodically to permit flow of fluid from one side of said barrier to the other.

6. In mechanism of the class described, a power shaft, a driven shaft, a clutch adapted to hold said shafts against relative rotation, and means independent of the relative speeds of rotation of said shafts, and actuated automatically from said driving shaft only for setting and releasing said clutch periodically.

7. In mechanism of the class described, a power shaft, a driven shaft, a clutch adapted to hold said shafts against relative rotation, means actuated from one of said shafts for setting and releasing said clutch periodically, and manually operable means for varying the relative lengths of the set and released periods.

8. In mechanism of the class described, a power shaft, a driven shaft, a clutch adapted to hold said shafts against relative rotation, means actuated from one of said shafts for setting and releasing said clutch periodically, and means for varying the relative lengths of the set and released periods.

9. In mechanism of the class described, a power shaft, a driven shaft, a clutch adapted to hold said shafts against relative rotation, means actuated from one of said shafts for setting and releasing said clutch periodically, and means operable during the rotation of said driven shaft for varying the relative lengths of the set and released periods.

10. In mechanism of the class described, a power shaft, a driven shaft, a clutch adapted to hold said shafts against relative rotation, means automatically operative during a fraction of each revolution for maintaining said clutch in set position, and manually operative means for varying the value of said fraction.

11. In mechanism of the class described, a power shaft, a driven shaft, a clutch adapted to hold said shafts against relative rotation, means automatically operative during a fraction of each revolution for maintaining said clutch in set position, and means for varying the value of said fraction.

12. In mechanism of the class described, a power shaft, a driven shaft, means interposed between said shafts for clutching and declutching them periodically, and means for varying the periods of clutching from zero through a plurality of increasing values up to one hundred per cent substantially.

13. In mechanism of the class described, a power shaft, a driven shaft, means interposed between said shafts for clutching and declutching them periodically, and means operable during the rotation of said driven shaft for varying the periods of clutching from zero through a plurality of increasing values up to substantially continuous clutching, the periods of declutching varying proportionately in the inverse ratio down to zero.

14. In mechanism of the class described, a power shaft, a driven shaft in alignment therewith, a clutch adapted to hold said shafts against relative rotation, means actuated from one of said shafts for setting and releasing said clutch periodically, and means manually operable during the rotation of said driven shaft for varying the relative lengths of said set and released periods.

15. In mechanism of the class described, a power shaft, a driven shaft in alignment therewith, a clutch adapted to hold said shafts against relative rotation, means actuated from one of said shafts for setting and releasing said clutch periodically, and means operable during the rotation of said driven shaft for varying the relative lengths of said set and released periods.

16. In mechanism of the class described, a power shaft, a driven shaft, a hydraulic clutch adapted to hold said shafts against relative rotation, means actuated from one of said shafts for setting and releasing said clutch periodically, and a manually controlled valve in said hydraulic clutch for varying the relative lengths of the set and released periods.

17. In mechanism of the class described, a power shaft, a driven shaft, a hydraulic clutch adapted to hold said shafts against relative rotation, means actuated from one of said shafts for setting and releasing said clutch periodically, and a valve in said hydraulic clutch operable for varying the relative lengths of the set and released periods.

18. In mechanism of the class described, a power shaft, a driven shaft, a hydraulic clutch adapted to hold said shafts against relative rotation, said clutch comprising liquid filling an endless path of flow, a pump having relatively movable parts carried by said two shafts, the rotation of the driving shaft with respect to the driven shaft operating said pump to produce such flow, and means for periodically interfering with the flow of the liquid, whereby the pump locks the said shafts together intermittently to deliver energy built up in the power shaft during the pumping interval.

19. In mechanism of the class described, a power shaft, a driven shaft, a hydraulic clutch adapted to hold said shafts against relative rotation, said clutch comprising liquid filling an endless path of flow, a pump having relatively movable parts carried by said two shafts, the rotation of the driving shaft with respect to the driven shaft operating said pump to produce such flow, means for periodically interfering with the flow of the liquid, whereby the pump locks the said shafts together intermittently to deliver energy built up in the power shaft during the pumping interval, and means for manually controlling the relative lengths of said periods of interference.

20. In mechanism of the class described, a power shaft, a driven shaft, a hydraulic clutch adapted to hold said shafts against relative rotation, said clutch comprising liquid filling an endless path of flow, a pump having relatively movable parts carried by said two shafts, the rotation of the driving shaft with respect to the driven shaft operating said pump to produce such flow, means for periodically interfering with the flow of the liquid, whereby the pump locks the said shafts together intermittently to deliver energy built up in the power shaft during the pumping interval, and means for controlling the relative lengths of said periods of interference.

21. In mechanism of the class described, a power shaft, a driven shaft, a hydraulic clutch adapted to hold said shafts against relative rotation, said clutch comprising liquid filling an endless path of flow, a pump having relatively movable parts carried by said two shafts, the rotation of the driving shaft with respect to the driven shaft operating said pump to produce such flow, means for periodically interfering with the flow of the liquid, whereby the pump locks the said shafts together intermittently to deliver energy built up in the power shaft during the pumping interval, and resilient means for relieving the fluid pressure on said pump.

22. In mechanism of the class described, a power shaft, a driven shaft, means interposed between said shafts for transmitting motion in impulses from one to the other at different average speeds, and means manually operable during the rotation of said driven shaft for varying the speed ratio between said shafts.

23. In mechanism of the class described, a power shaft, a driven shaft, means interposed between said shafts for transmitting motion in impulses from one to the other at different average speeds, and means operable during the rotation of said driven shaft for varying the speed ratio between said shafts.

24. In an automotive vehicle, an internal combustion engine having a given number of torque impulses per revolution of its crank shaft, a driven shaft, and means interposed between said crank shaft and driven shaft for transmitting to said driven shaft a number of separated power impulses per revolution of the crank shaft equal in number to the said torque impulses.

25. In an automotive vehicle, a four-cycle internal combustion engine having an even number of cylinders, a fly-wheel driven from said engine, a driven shaft, and means interposed between said fly-wheel and driven shaft for transmitting a number of power impulses to said shaft during each revolution of the fly-wheel equal in number to one-half the number of said cylinders.

26. In mechanism of the class described, driving and driven shafts, a hydraulic clutch interposed between said shafts adapted to lock them together against relative rotation, and means for circulating liquid through said clutch to prevent excessive heat therein.

27. In mechanism of the class described, a power shaft, a driven shaft, a hydraulic clutch adapted to hold said shafts against relative rotation, said clutch comprising liquid filling an endless path of flow, a pump having relatively movable parts carried by said two shafts, the rotation of the driving shaft with respect to the driven shaft operating said pump to produce such flow, means for periodically interfering with the flow of the liquid comprising a ported valve member arranged to be oscillated by the rotation of the power shaft, whereby the pump locks the said shafts together intermittently to deliver energy built up in the power shaft during the pumping interval, a second ported valve member arranged to cooperate with said first member, and means movable axially of one of said shafts for varying the position of said second member, whereby the periods of interference may be lengthened or shortened.

28. In mechanism of the class described, a power shaft, a driven shaft, and means interposed between said shafts for transmitting a power impulse to the driven shaft during a fraction of each revolution of the power shaft without regard to the relative speeds of the shafts, the duration of the individual impulses being variable.

29. In mechanism of the class described, a power shaft, a driven shaft, and means interposed between said shafts for transmitting a power impulse to the driven shaft during a fraction of each revolution of the power shaft without regard to the relative speeds of the shafts, the intensity of the individual impulses increasing with the length of the interval between impulses, and the duration of the individual impulses being variable.

30. In mechanism of the class described, a power shaft, a driven shaft, and means interposed between said shafts for transmitting a power impulse to the driven shaft during a fraction of each revolution of the power shaft without regard to the relative speeds of the shafts, the intensity of the individual impulses being variable.

In testimony whereof, I hereunto affix my signature.

ALVA B. GILBERT.